(12) United States Patent
Zribi et al.

(10) Patent No.: US 11,792,037 B2
(45) Date of Patent: Oct. 17, 2023

(54) SAFETY AUTOMATION SYSTEM

(71) Applicant: Carrier Corporation, Palm Beach Gardens, FL (US)

(72) Inventors: Anis Zribi, Colorado Springs, CO (US); Travis Silver, Colorado Springs, CO (US); Jonathon Hughes, Durham, NC (US); John Andres, Chapel Hill, NC (US); Chris Rovenstine, Chapel Hill, NC (US); Sean Curley, Greensboro, NC (US); Michael L. Richards, Colorado Springs, CO (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 8 days.

(21) Appl. No.: 17/544,623

(22) Filed: Dec. 7, 2021

(65) Prior Publication Data

US 2022/0103394 A1    Mar. 31, 2022

Related U.S. Application Data

(63) Continuation of application No. 15/744,611, filed as application No. PCT/US2016/041998 on Jul. 13, 2016, now Pat. No. 11,240,056.
(Continued)

(51) Int. Cl.
*G08B 21/00* (2006.01)
*H04L 12/28* (2006.01)
(Continued)

(52) U.S. Cl.
CPC .......... *H04L 12/2818* (2013.01); *G05B 15/02* (2013.01); *G08B 17/00* (2013.01);
(Continued)

(58) Field of Classification Search
CPC ............. H04L 12/2818; H04L 12/2825; H04L 12/2827; H04L 2012/2841;
(Continued)

(56) References Cited

U.S. PATENT DOCUMENTS 4,388,616 A * 6/1983 Machida ................ G08B 17/00
340/629
4,675,541 A 6/1987 Peters et al.
(Continued)

FOREIGN PATENT DOCUMENTS

CN 101947379 A 1/2011
CN 102063116 A 5/2011
(Continued)

OTHER PUBLICATIONS

"SmartHouse Code of Practice"; Cenelec Workshop Agreement; CWA 50487; Nov. 2005; 230 Pages.
(Continued)

*Primary Examiner* — Mark S Rushing
(74) *Attorney, Agent, or Firm* — CANTOR COLBURN LLP

(57) ABSTRACT

A safety automation system for an occupiable structure includes a computing management system, a first detection device, and a second detection device. The management system includes a computer processor, and a computer readable storage medium configured to run embedded software, The first detection device is adapted to detect a hazard condition and output an associated hazard condition detected signal to the computing management system. The second detection device is adapted to detect the presence of an occupant in the occupiable structure and the occupant's proximity to the first detection device, and output an occupied signal to the computing management system. The computing management system adjusts the sensitivity of the
(Continued)

first detection device based on occupancy and proximity of the occupant to the first detection device.

4 Claims, 8 Drawing Sheets

Related U.S. Application Data

(60) Provisional application No. 62/191,809, filed on Jul. 13, 2015.

(51) Int. Cl.
*G08B 19/00* (2006.01)
*G05B 15/02* (2006.01)
*G08B 17/00* (2006.01)
*G08B 25/14* (2006.01)
*A62C 37/44* (2006.01)

(52) U.S. Cl.
CPC ........ *G08B 19/005* (2013.01); *H04L 12/2825* (2013.01); *H04L 12/2827* (2013.01); *A62C 37/44* (2013.01); *G05B 2219/2642* (2013.01); *G08B 25/14* (2013.01); *H04L 2012/285* (2013.01); *H04L 2012/2841* (2013.01)

(58) Field of Classification Search
CPC .............. H04L 2012/285; G05B 15/02; G05B 2219/2642; G08B 17/00; G08B 19/005; G08B 25/14; A62C 37/44
USPC ....................................................... 340/577
See application file for complete search history.

(56) References Cited

U.S. PATENT DOCUMENTS

| | | | |
|---|---|---|---|
| 4,837,560 A | 6/1989 | Newberry | |
| 6,792,319 B1 | 9/2004 | Bilger | |
| 6,909,921 B1* | 6/2005 | Bilger | G08B 21/0492 700/63 |
| 7,005,994 B2 | 2/2006 | King | |
| 7,391,319 B1* | 6/2008 | Walker | G08B 7/06 340/5.31 |
| 7,696,891 B2 | 4/2010 | Whitney | |
| 7,734,572 B2 | 6/2010 | Wiemeyer et al. | |
| 8,145,357 B2 | 3/2012 | Nibler et al. | |
| 8,833,477 B2 | 9/2014 | Kang | |
| 8,970,365 B2* | 3/2015 | Wedig | G08B 21/0423 340/539.18 |
| 2002/0029085 A1 | 3/2002 | Park | |
| 2004/0260812 A1 | 12/2004 | Rhodes et al. | |
| 2009/0139162 A1 | 6/2009 | Mancini | |
| 2010/0070097 A1 | 3/2010 | Morgenstern et al. | |
| 2010/0114389 A1 | 5/2010 | Chatterton et al. | |
| 2010/0149708 A1 | 6/2010 | Fuller et al. | |
| 2014/0067130 A1 | 3/2014 | Pillai et al. | |
| 2014/0167969 A1 | 6/2014 | Wedig et al. | |
| 2014/0266669 A1* | 9/2014 | Fadell | G08B 27/003 340/501 |
| 2015/0025659 A1 | 1/2015 | Bartlett et al. | |
| 2015/0097689 A1* | 4/2015 | Logue | H04W 4/029 340/632 |
| 2015/0159401 A1 | 6/2015 | Patrick et al. | |
| 2015/0163412 A1 | 6/2015 | Holley et al. | |
| 2015/0316285 A1 | 11/2015 | Clifton et al. | |
| 2016/0123741 A1 | 5/2016 | Mountain | |
| 2016/0191270 A1 | 6/2016 | Huang et al. | |

FOREIGN PATENT DOCUMENTS

| | | |
|---|---|---|
| CN | 102339044 A | 2/2012 |
| CN | 102622844 A | 8/2012 |
| CN | 103956018 A | 7/2014 |
| EP | 1643324 B1 | 6/2013 |

OTHER PUBLICATIONS

Byun et al.; "An Intelligent Self-Adjusting Sensor for Smart Home Services Based on ZigBee Communications"; IEEE Transactions on Consumer Electronics; vol. 58, No. 3; Aug. 2012; pp. 794-802.
Chinese Office Action Issued in Chinese Application No. 201680045063.6 dated Mar. 25, 2019; 26 Pages.
European Communication Issued in European Application No. 16751704.4 dated Oct. 9, 2020; 8 Pages.
International Search Report Issued in International Application No. PCT/US2016/041998 dated Sep. 26, 2016; 6 Pages.
Vanus et al.; The Proposal of the Smart Home Care Solution with KNX Components; IEEE; 2015; 5 Pages.
Written Opinion Issued in International Application No. PCT/US2016/041998 dated Sep. 26, 2016; 19 Pages.

* cited by examiner

SAFETY AUTOMATION SYSTEM

CROSS-REFERENCE TO RELATED APPLICATIONS

This application is a Continuation of U.S. patent application Ser. No. 15/744,611 filed Jan. 12, 2018, which claims the benefit of National Stage Application No. PCT/US2016/041998 filed Jul. 13, 2016, which claims the benefit of U.S. Provisional Patent Application No. 62/191,809 filed Jul. 13, 2015, the disclosures of which are incorporated herein by reference in their entirety.

BACKGROUND

The present disclosure relates to a safety automation system and, more particularly, to a system utilizing appliances to deter a hazard condition.

The expansion of home automation and associated technologies is known to enhance the life and safety of occupants by leveraging fire safety devices in conjunction with various alert devices, thus adding value to connected ecosystems in homes and other occupiable structures. Further development of home automation as it relates to any hazard condition and the protection of occupants and other individuals is desirable.

SUMMARY

A safety automation system for an occupiable structure according to one, non-limiting, embodiment of the present disclosure includes a computing management system including a computer processor, and a computer readable storage medium configured to run embedded software and cloud server software; a detection device adapted to detect a hazard condition and output an associated hazard condition detected signal to the computing management system; and a condition deterrence device configured to accept an electrical command signal from the computing management system associated with the hazard condition detected signal and to control an appliance to at least reduce risk presented by the condition.

Additionally to the foregoing embodiment, the computing management system is configured to send a wireless notification signal of the hazard condition to a mobile user interface device.

In the alternative or additionally thereto, in the foregoing embodiment, the hazard condition is a fire condition and the wireless notification signal includes the location of portable fire extinguishers within the occupiable structure.

In the alternative or additionally thereto, in the foregoing embodiment, the computing management system is at least in-part a portion of a cloud computing system.

In the alternative or additionally thereto, in the foregoing embodiment, the appliance is an ingress/egress point of the occupiable structure, and the condition deterrence device includes a lock configured to at least lock or unlock the ingress/egress point as directed by the computing management system.

In the alternative or additionally thereto, in the foregoing embodiment, the appliance is a garage door and the condition deterrence device includes a motor configured to at least open or close the garage door as directed by the computing management system.

In the alternative or additionally thereto, in the foregoing embodiment, the appliance is a pet door and the condition deterrence device includes an actuator configured to open or close the pet door as directed by the computing management system.

In the alternative or additionally thereto, in the foregoing embodiment, the appliance is a curtain and the condition deterrence device includes an motor configured to at least open or close the curtain as directed by the computing management system.

In the alternative or additionally thereto, in the foregoing embodiment, the appliance is a gas main and the condition deterrence device includes an actuated valve configured to shut-off the gas main as directed by the computing management system.

In the alternative or additionally thereto, in the foregoing embodiment, the appliance is a gas fireplace and the condition deterrence device includes an actuated valve configured to isolate the gas fireplace as directed by the computing management system.

In the alternative or additionally thereto, in the foregoing embodiment, the appliance is an electric load center and the condition deterrence device includes a circuit breaker for at least in-part isolating the load center as directed by the computing management system.

In the alternative or additionally thereto, in the foregoing embodiment, the appliance is a solar panel and the condition deterrence device includes a circuit breaker for electrically isolating the solar panel as directed by the computing management system.

In the alternative or additionally thereto, in the foregoing embodiment, the appliance is an electrostatic filter and the condition deterrence device is configured to energize the filter as directed by the computing management system.

In the alternative or additionally thereto, in the foregoing embodiment, the appliance is a humidifier and the condition deterrence device is configured to actuate the humidifier as directed by the computing management system.

In the alternative or additionally thereto, in the foregoing embodiment, the appliance is a HVAC system including a controller, a blower and a filter, and the condition deterrence device is configured to communicate with the controller as directed by the computing management system for removing smoke from, or redirecting smoke in, an air stream.

In the alternative or additionally thereto, in the foregoing embodiment, the appliance is a plurality of intelligent air vents constructed and arranged to close for deterring gas diffusion throughout the occupiable structure.

In the alternative or additionally thereto, in the foregoing embodiment, the command signal is a wireless command signal.

A safety automation system for an occupiable structure according to another, non-limiting, embodiment includes a computing management system including a computer processor, and a computer readable storage medium configured to run embedded software; a first detection device adapted to detect a hazard condition and to output an associated hazard condition detected signal to the computing management system; and a second detection device adapted to detect the presence of an occupant in the occupiable structure and the occupant's proximity to the first detection device, and to output an occupied signal to the computing management system, and wherein the computing management system adjusts the sensitivity of the first detection device based on occupancy and proximity of the occupant to the first detection device.

A safety automation system for an occupiable structure according to another, non-limiting, embodiment includes a detection device disposed in the occupiable structure; and a computing management system in wireless communication with the detection device, the computing management system including a computer processor, and a computer readable storage medium configured to run embedded software, and wherein the computing management system is configured adjust sensitivity of the detection device based on a time of day.

A safety automation system for an occupiable structure according to another, non-limiting, embodiment includes a detection device disposed in the occupiable structure; a Global Position System transmitter device; and a computing management system in wireless communication with the detection device, the computing management system including a computer processor and a computer readable storage medium configured to run embedded software, and wherein computing management system is configured to determine a location of the Global Positioning System transmitter device and adjust a sensitivity of the detection device based on the location of the Global positioning System transmitter device.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
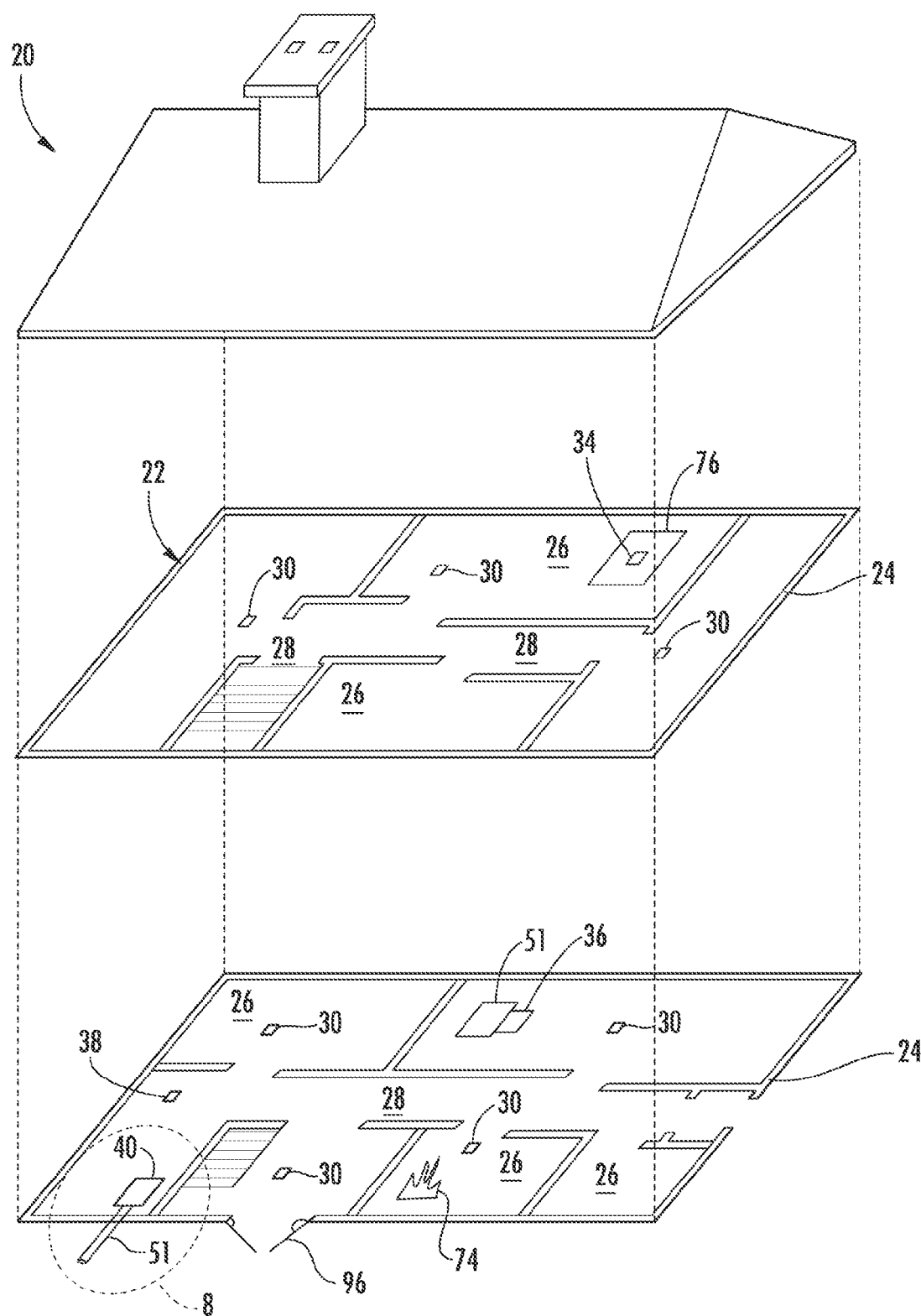
FIG. 1 is an exploded perspective view of an occupiable structure illustrated as an application for a safety automation system.

Referring to FIG. 1, an exemplary embodiment of a safety automation system 20 is illustrated and may be applied to occupiable structures 22 such as, for example, residential homes, apartment buildings, business buildings, ships, service centers such as hospitals and hotels, and other structures. The occupiable structure 22 may have any number of floors 24 each having any number of rooms 26. The floors 24 and rooms 26 may be interconnected by a plurality of routes 28 (i.e., entry and egress) that may include hallways, stairs, elevators, and others.

Figure 2:
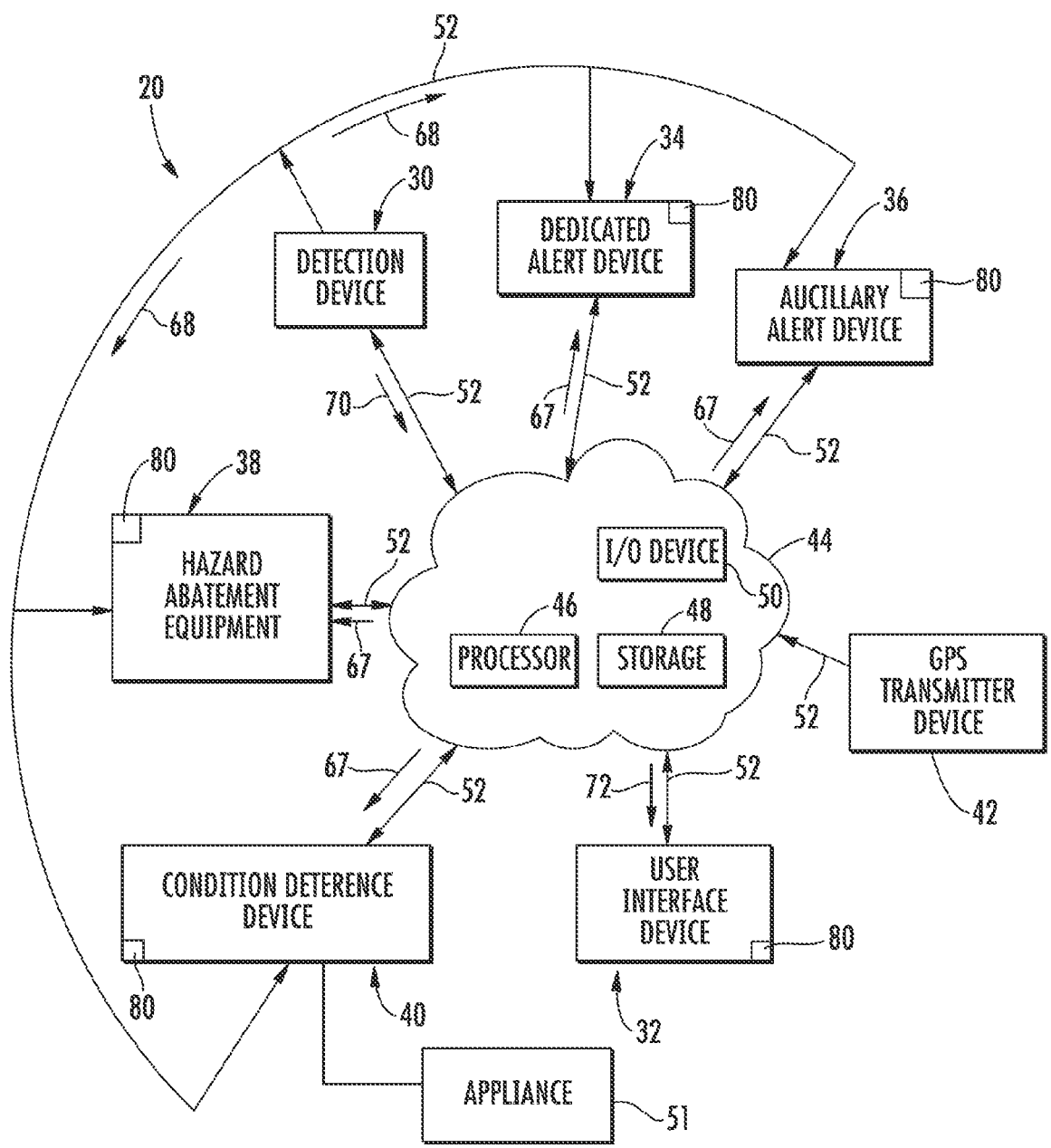
FIG. 2 is a system diagram of the safety automation system.

Referring to FIGS. 1 and 2, the safety automation system 20 may include an assortment of hardware including: detection and/or monitoring devices 30; user interface devices 32; primary or dedicated alert devices 34; ancillary alert devices 36; hazard abatement equipment or devices 38; condition deterrence devices 40; a satellite navigation transmitter device 42 and a computing management system 44 that may include a computer processor 46, a computer readable storage medium 48 and an I/O device 50.

The detection devices 30 may generally be located in or on the occupiable structure 22 and may be constructed to detect hazards including smoke, fire, toxic gases, explosive gases, temperature extremes, fast rate of temperature change, intrusion, and other conditions. Non-limiting examples of a detection device 30 may include smoke detectors (e.g., light-based, ionizing, pyroelectric, infrared, and image-sensor or camera based), detectors of carbon monoxide, methane, propane, and formaldehydes, and flame detectors, and other types.

The user interface device 32 may be locally or remotely located and may generally alert the user of a detected hazard while providing additionally information with regard to the structure 22, structure occupant(s), system maintenance, and other information. Additionally the user interface device may include interactive prompts that may be selected by the user (e.g., use of a mouse and curser, touching the prompt on a touch screen environment, by issuing a voice command in a voice control I/O environment, etc.) to issue a command Non-limiting examples of a user interface device 32 may include a computer monitor or screen (e.g., tablet, desktop and laptop), a cellular telephone, a media player (or other handheld or portable electronic device), a wrist-watch device, a pendant device, a headphone or ear-piece device, a router, an embedded system with electronic equipment and a display mounted in a kiosk or automobile, equipment that implements the functionality of two or more of these devices, and others.

The dedicated alert devices 34 may generally be located in or at the occupiable structure 22 and may further be integrated into any one or more of the variety of detection devices 30. Dedicated alert devices 34 are devices that have the specific function of alerting occupants and others when a hazard condition is detected by the detection device 30. Such alerts may include visual, audio, tactile and other alerts. Non-limiting examples of dedicated alert devices 34 may include strobe lights strategically located in the structure 22, verbal alerts over a dedicated intercom, and others. The dedicated alert device 34 may provide appropriate alerts for any one of a plurality of hazard conditions including smoke, fire, tornadoes, earthquakes, hurricanes, carbon monoxide, methane, propane, refrigerant leaks, and others. It is further contemplated and understood that for external hazard conditions such as tornadoes, earthquakes and hurricanes, the dedicated alert devices 34 may be triggered by an external alert from, for example, a weather service.

In contrast to the dedicated alert devices 34, the ancillary alert devices 36 may be those devices that serve an everyday, normal, function, but are also capable of providing an alert function for a safety hazard condition. Moreover, ancillary alert devices 36 may be devices intended to provide alerts of one condition type (e.g., security) and at least some portion thereof may serve to provide an alert of a different hazard condition (e.g., fire). Non-limiting examples of ancillary alert devices 36 may include: a vibrating and/or temperature-cooled bed or other furniture; audio alarms on home appliances that would normally signify completion of a process cycle such as that found in ovens, clothes washing and drying machines; alarm clocks; television speakers, home theater speakers, and others. Particular appliances that provide motion, temperature and/or visual alerts are beneficial for the hearing impaired, and alerts that provide motion, temperature and/or audio alerts are beneficial for the sight impaired.

The hazard abatement device 38, is equipment that is initiated to subdue or alleviate a hazard condition. Such equipment 38 may be controlled via the computing management system 44 and/or may be self-initiated. Non-limiting examples of hazard abatement device 38 may include fire suppression equipment such as sprinkler systems, chemical fire suppressor dispensing systems, high output steam humidifiers, window release and/or opening devices (i.e., in case of carbon monoxide or other gas detection), and others.

The condition deterrence devices 40, may not directly abate a hazard condition, but: may reduce risk of further hazards as a result of the detected hazard conditions; assist in occupant evacuation; assist emergency personnel called to the hazard; and/or, assist in occupant comfort, health and/or safety. Each condition deterrence device 40 may generally be associated with, or may be part of, an appliance 51. Non-limiting examples of an appliance 51 may include: an air handling system that may be part of a forced air heating and cooling system, an air filtration system, a door lock, a humidity control system, an electrical load center, a home entertainment system, and others. Non-limiting examples of condition deterrence devices 40 may include control systems for gas valves, lighting, window locks and others.

The satellite navigation transmitter device 42 may be mobile and is configured to transmit a location signal over pathway 52 to the computing management system 44. The computing management system 44 may generally be part of a cloud computing network that allows application software to be operated using internet-enabled devices. Alternatively, (or in addition to cloud computing), the computing management system 44 may generally be integrated into one or more of the devices 30, 32, 34, 36, 38, 40. The processor 46 of the computing management system 44 may further be programmed to self-monitor and take some form of action to facilitate system maintenance and/or system updating operations.

The devices 30, 32, 34, 36, 38, 40, 42 and/or computing management system 44 may be powered via direct (e.g., batteries) or alternating current, and may be inter-linked by a communications network having communication pathways 52 to establish a network of a plurality of devices 30, 32, 34, 36, 38, 40, 42 and computing management system 44. The communication pathways 52 may include wired and/or wireless pathways. Non-limiting examples of wired pathways 52 may include pathways that pass through the internet, local area network equipment, and other networks. Non-limiting examples of wireless pathways may include cellular telephone network pathways, local area network pathways, and others.

Figure 3:
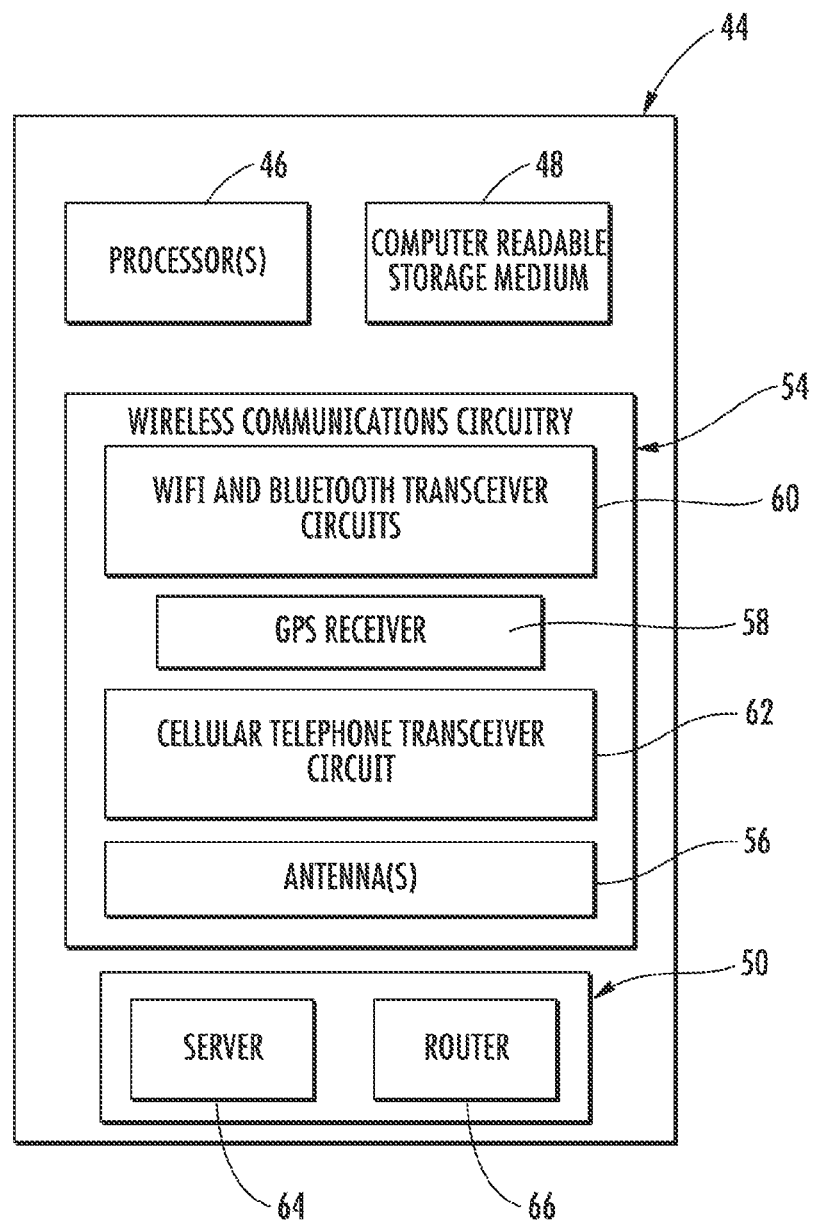
FIG. 3 is a schematic of a computing management system of the safety automation system.
Figure 4:
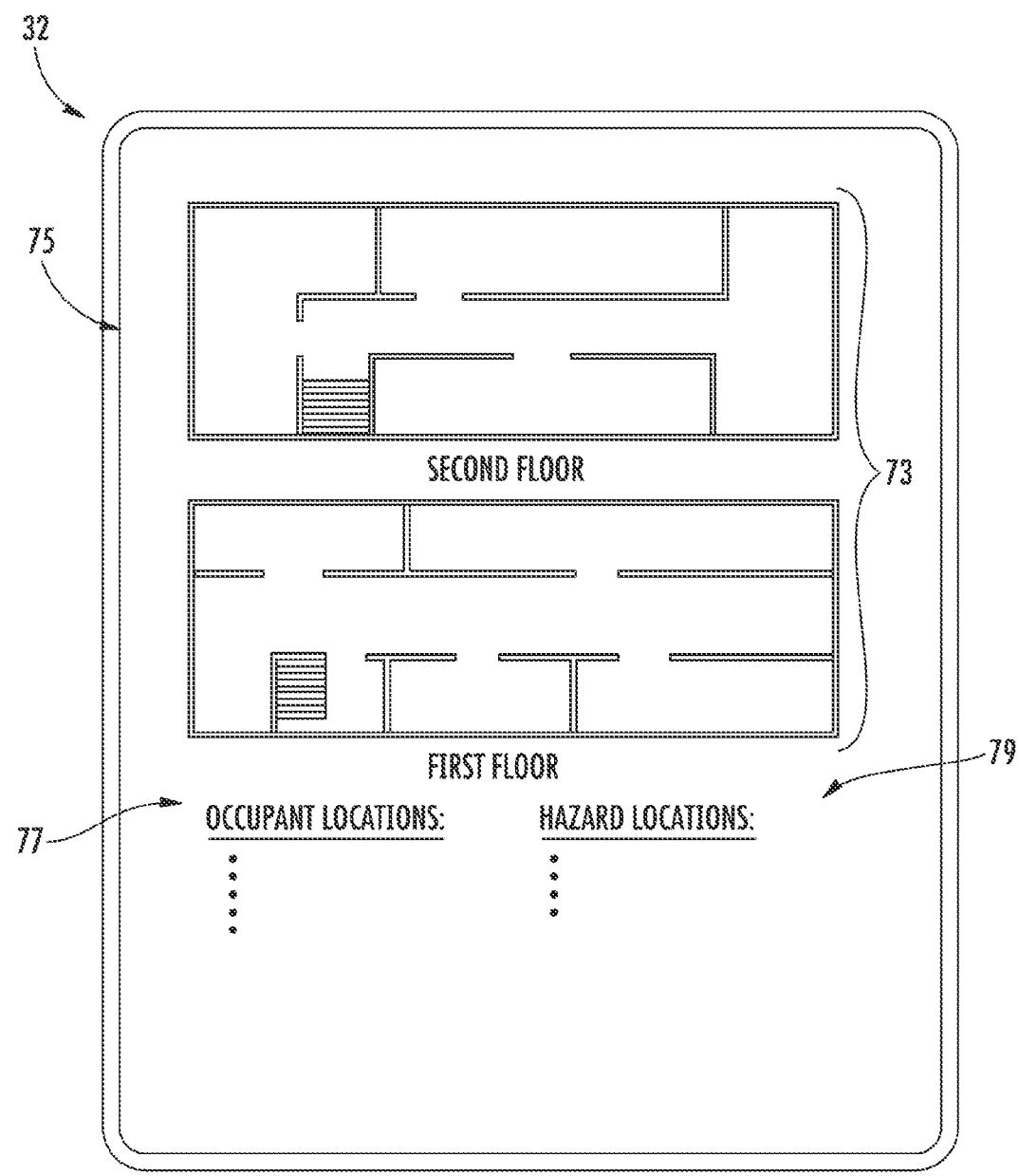
FIG. 4 is a view of an interactive screen of a user interface device of the safety automation system.

Referring to FIG. 3, the computing management system 44 of the system 20 may include control circuitry such as the processor 46 and the computer readable storage medium 48. The storage medium 48 may include hard disk drive storage, nonvolatile memory (e.g., flash memory or other electrically-programmable-read-only memory configured to form a solid state drive), volatile memory (e.g., static or dynamic random-access-memory), and others. The processor 46 and storage medium 48 may be used to control and/or receive signals from any one or more of the devices 30, 32, 34, 36, 38, 40, 42. The processor 46 may be based on one or more microprocessors, microcontrollers, digital signal processors, baseband processors, power management units, audio codec chips, application specific integrated circuits, and others.

The processor 46 may be used to run embedded and cloud server software such as internet browsing applications, voice-over-internet-protocol (VOIP) telephone call applications, email applications, media playback applications, operating system functions, and others. To support interactions with external equipment, the processor 46 may be used in implementing communications protocols. Such communication protocols may include internet protocols, and wireless local area network protocols (e.g. WiFi®), protocols for other short-range wireless communications links such as the Bluetooth® protocol, cellular telephone protocols, and others.

The computing management system 44 may further include wireless communications circuitry 54 that may include radio-frequency (RF) transceiver circuit, power amplifier circuit, low-noise input amplifiers, passive RF components, at least one antenna 56, and other components for receiving and broadcasting RF wireless signals over pathways 52. Circuitry 54 may further include a satellite navigation system receiver circuit 58, a wireless local area network transceiver circuit 60, cellular telephone transceiver circuit 62, and others. The satellite navigation system receiver circuit 58 receives location signals from the satellite navigation transmitter device 42, and may be a Global Positioning System (GPS) receiver circuit, or circuitry associated with other satellite navigation systems. The wireless local area network transceiver circuit 60 may handle pre-specified frequency bands for WiFi® and/or Bluetooth® protocols. Although not illustrated, the wireless communication circuitry 54 may also include wireless circuits for receiving signals from radios, televisions, pagers, and others.

The I/O device 50 of the computing management system 44 facilitates the input and output of signals from and to any number of the devices 30, 32, 34, 36, 38, 40, 42. I/O device 50 may therefore include a server 64 and a router 66 having a plurality of ports with each port associated with a respective device 30, 32, 34, 36, 38, 40, 42. Alternatively, the ports may be dynamically allocated ports.

Referring to FIGS. 1 through 4, any number of devices 30, 32, 34, 36, 38, 40, 42 may be located in and/or outside of the occupiable structure 22. The detection device 30 may be configured to send initiation signals (see arrows 68 in FIG. 2) over pathways 52 directly to any one or more of the dedicated alert devices 34, ancillary alert devices 36, hazard abatement devices 38 and condition deterrence devices 40. Any combination of devices 30, 32, 34, 36, 38, 40, 42 may be integrated together in, for example, a common housing. As one example, the detection device 30 may be a smoke detector and the dedicated alert device may be an audible alert housed in the smoke detector. As another example, the user interface device 32 may be a mobile cellular telephone or an interactive display mounted in an automobile, and the satellite navigation transmitter device 42 may be physically integrated into the cellular telephone or the automobile, respectively.

In operation, the safety automation system 20 may provide notification of a hazard condition associated with safety and property damage risks while the occupant or other individual is outside of the occupiable structure 22. For example, the detection device 30 may detect a hazard condition and output a hazard detected signal (see arrow 70 in FIG. 2) over pathway 52 to the computing management system 44. In accordance with pre-programmed instructions, the processor 46 via the I/O device 50 may send a notification signal (see arrow 72) over pathway 52 to the cellular telephone 32 carried by the occupant while outside of the occupiable structure 22. Upon receipt of a hazard detected signal 70, the computing management system 44 may process and send a command signal (see arrow 67) to any one or more of the hazard abatement devices 38, the condition deterrence devices 40, the dedicated alert devices 34, and the ancillary alert devices 36 over pathways 52.

Hazard Notification, Assisted Egress, and Device Maintenance:

The management system 44 may further provide an assortment of pre-programmed information (i.e., computer readable data) to the user or occupant based on the hazard condition detected. For example, if a fire 74 is detected, contact information of the nearest fire department may be provided. If an intruder is detected, contact information of the nearest police department may be provided. Yet further, the management system 44 may contact the user via the user interface device 32 with other information not initiated by a hazard detection/condition. For example, other information may include maintenance scheduling, results of a self-check of the system 20, device troubleshooting, location of a disabled device, and others. For example, the batteries in smoke detectors 30 may be scheduled for replacement as pre-programed into the system 44 or as a result of a system self-check. The management system 44 may notify the user of this need via the user interface device 32 at any time. Alternatively, or in addition thereto, when the user interface device 32 and the GPS transmitter device 42 is in an automobile, the management system 44 may continuously track the location of the user, and may notify or remind the user that replacement batteries are required and that a maintenance part retail store is on-route or nearby.

The safety automation system 20 may further provide notification about the location 79 (see FIG. 4) of the hazard condition within the occupiable structure 22, the hazard propagation path, and the location 77 of any occupants in the occupiable structure 22. For example, the hazard condition may be an intrusion and the detection device 30 may be a plurality of motion sensors located strategically throughout the structure 22. As each sensor detects motion and sequentially sends a hazard detected signal 70 to the computing management system 44 over pathways 52, the processor 46 along with the computer readable storage medium 48 may track the progression of the intruder and associate the intruder location 79 and resulting progression with a map 73 (i.e., image, see FIG. 4) of the structure 22 pre-programed into the management system 44 and displayed on an interactive screen 75 of the user interface device 32. A plurality of notification signals 72, which generally track this progression in real time, may be sent to the user interface device 32 carried by the occupant (e.g., cellular telephone) and/or possessed by other individuals such as a police force (e.g., interactive screen 75 in a patrol automobile). In addition, expected or designated occupant locations 77 (see FIG. 4) in the structure 22 may be pre-programmed into the management system 44 and displayed adjacent to or as part of the structure map 73 displayed on the screen 75 of the user interface device 32.

Another, non-limiting, example may include mapping of fire propagation. That is, the smoke levels detected by multiple smoke detector devices 30 and associated alarm or alert devices 34, and/or the carbon monoxide levels measured by multiple detectors and/or alarms throughout the occupiable structure 22 may be used to determine where a fire initiated and where the fire is propagating, as well as the number of occupants and their locations. This information may be made available to first responders for the creation of a fire fighting strategy.

The safety automation system 20 may further provide 'customized' notification about safety hazard conditions, severe weather hazard conditions (i.e, weather report) and/or property damage hazard conditions while an occupant may be inside the occupiable structure 22. Such notification may be facilitated by leveraging the dedicated alert devices 34 and/or ancillary alert devices 36 that may be, as non-limiting examples, acoustic, visual and/or tactile devices in communication with the management system 44. More specific examples of devices 34, 36 may include bed shakers, strobes, security sirens, speakers, mobile devices, televisions, room lights, and others. The management system 44 may enable a degree of customized operation of devices 34, 36 relevant to the frequency of notifications and/or reminders on any given hazard condition occurrence, the types of sound, the color of light, and others.

As one, non-limiting, example, a fire 74 may occur in room 26 on the first floor 24 of the occupiable structure 22. A hearing-impaired occupant may be sleeping in a bed 76 in room 26 on the second floor 24. A dedicated alert device 34 may be a shaker mechanism constructed to shake or vibrate the mattress of the bed 76, thus providing an alert to wake a sleeping occupant who may be hearing impaired. Alternatively, the shaker mechanism may be an ancillary alert device 36 providing a dual function that includes the ability to provide a soothing massage upon demand by the occupant, and the alert function described herein. Similarly, the bed 76 may include a temperature mechanism as an ancillary alert device 36 that generally keeps the bed at a comforting controlled temperature, and may provide a more drastic temperature reduction to alert the occupant of a hazard condition.

In operation (i.e., bed shaker), a smoke detector 30 in room 26 on the first floor 24 may detect smoke from the fire 74. The smoke detector 30 may output an initiation signal 68 directly to the ancillary alert device 36 in the bed shaker 76 and/or output a hazard detected signal 70 to the computing management system 44 via the pathways 52, and I/O device of the system 44. The processor 46 may then initiate, and the I/O device 50 outputs a command signal (see arrow 78 in FIG. 2) to the ancillary alert device 36 to initiate shaking of the bed 76.

Alternatively, or in addition to, the shaking of the bed 76, a dedicated alert device 34 may be a flashing strobe configured to alert a hearing-impaired occupant. Alternatively, the flashing strobe may be an ancillary alert device 36 having a primary function as a security strobe with the secondary function to provide a visual smoke alert. The management system 44 may further provide a degree of customization concerning the various hazard alerts. For example, the amplitude and/or frequency of the shaking bed 76 may be pre-programmed into the management system 44 via, for example, the user interface device 32. Similarly, the flashing frequency and the color of the flashing strobe may be adjustable and pre-programmed into the management system 44.

The safety automation system 20 may further provide effective reporting to first responders and emergency personnel, thus facilitating fast arrival to the occupiable structure 22, accurate location of the structure 22, safe access to and within the structure, navigation inside the structure, location 77 of occupants, location of portable fire extinguishers, and communication with the occupants. As one, non-limiting, example, the first responders may be a local, municipal fire department that possesses a mobile user interface device 32 that may be mounted directly into, for example, a fire truck. A GPS transmitter device 42 may be integrated into the user interface device 32 and the location of the occupiable structure 22 may be pre-programmed into the management system 44. A display of driving directions to the structure 22 may then be provided on the screen 75 of the user interface device 32. The same interface device 32, or a mobile interface device 32 carried by a fireman, may also provide pre-programmed occupant locations 77 with the map 73 of the structure 22. In real time, the management system 44 may receive multiple hazard detected signals 70 from a plurality of strategically placed detection devices 30. Each detection may be outputted by the management system 44 as a notification signal 72 and displayed on the map 73, thereby providing location 79 and propagation information of the fire 74.

Yet further, with the occupant mapping locations 77 described above, the firemen may utilize, for example, a microphone 80 (see FIG. 2) built into the user interface device 32 to communicate with occupants in the structure 22. Communications may be processed via the management system 44 utilizing existing audio-based alert devices 34, 36.

Although in the example provided above, the fire department possesses a user interface device 32, it is further contemplated and understood that the management system 44 may contact any number of various municipal departments and/or individuals (e.g., neighbors and close social media contacts) via more conventional means such telephones, email addresses and other means pre-programmed into the management systems 44.

Figure 5:
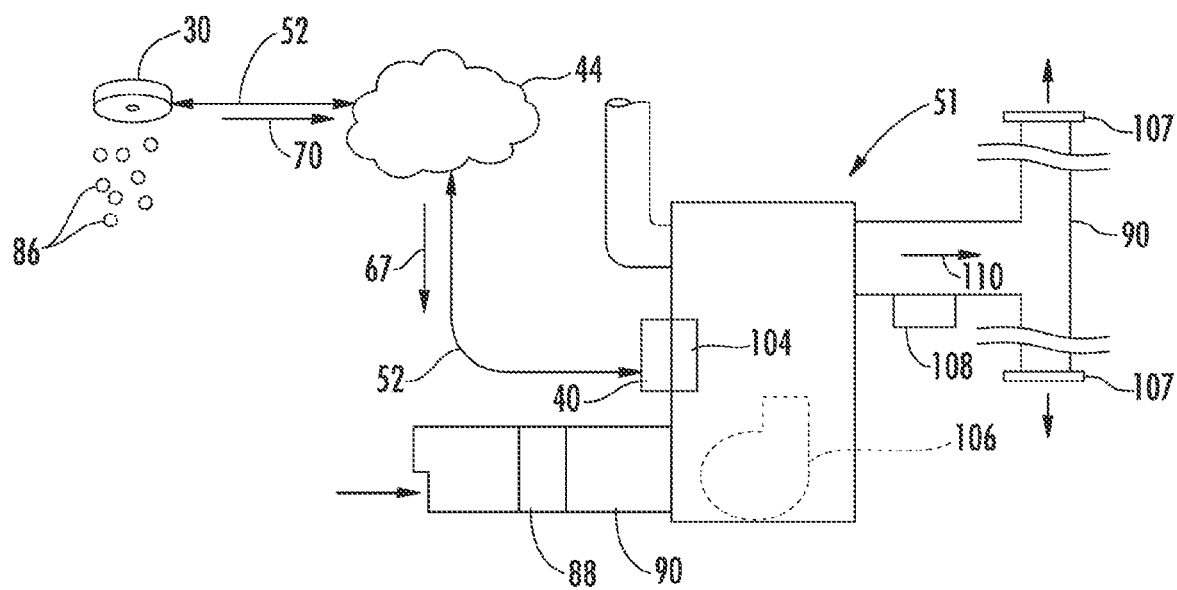
FIG. 5 is a system diagram of a first embodiment of the safety automation system having a forced air heating and cooling system as an appliance and a smoke detector as a detection device of the system.

Comfort and Health Monitoring:

Referring to FIGS. 2 and 5, the automation system 20 may further facilitate improvement of air quality in the occupiable structure 22 by using smoke detectors 30 to measure air particles 86 (e.g., smoke) levels and utilizing air filters 88 (e.g., electrostatic air filter) of an appliance 51 to control such particle levels in the air. More specifically, the smoke detectors 30 may detect air particle levels in specific areas or rooms 26 of the structure 22, and wirelessly communicate (i.e., signal 70) these levels to the computing management system 44. System 44 may then process the signal 70 and take condition deterrence measures as instructed via the embedded software. Such measures may entail the control of, for example, an entire forced air heating and cooling (HVAC) system 51 (i.e., appliance) via the condition deterrence device 40 which receives a command signal 67 from the management system 44.

The condition deterrence device 40 may be configured to mechanically open a damper (not shown) that exposes the air filter 88 located in a duct 90. Alternatively, or in addition thereto, the device 40 may instruct the heating and cooling system 51 to initiate an air filtration cycle. Through a plurality of dampers, such a cycle may be directed to specific areas of the structure 22 having the greatest density of smoke 86 as indicated by the plurality of smoke detectors 30. Alternatively, or in addition thereto, the device 40 may instruct the heating and cooling system 51 to selectively close dampers near areas of the structure 22 having the greatest concentration of particles 86 so as to cut off the supply of fresh air to that area.

Figure 6:
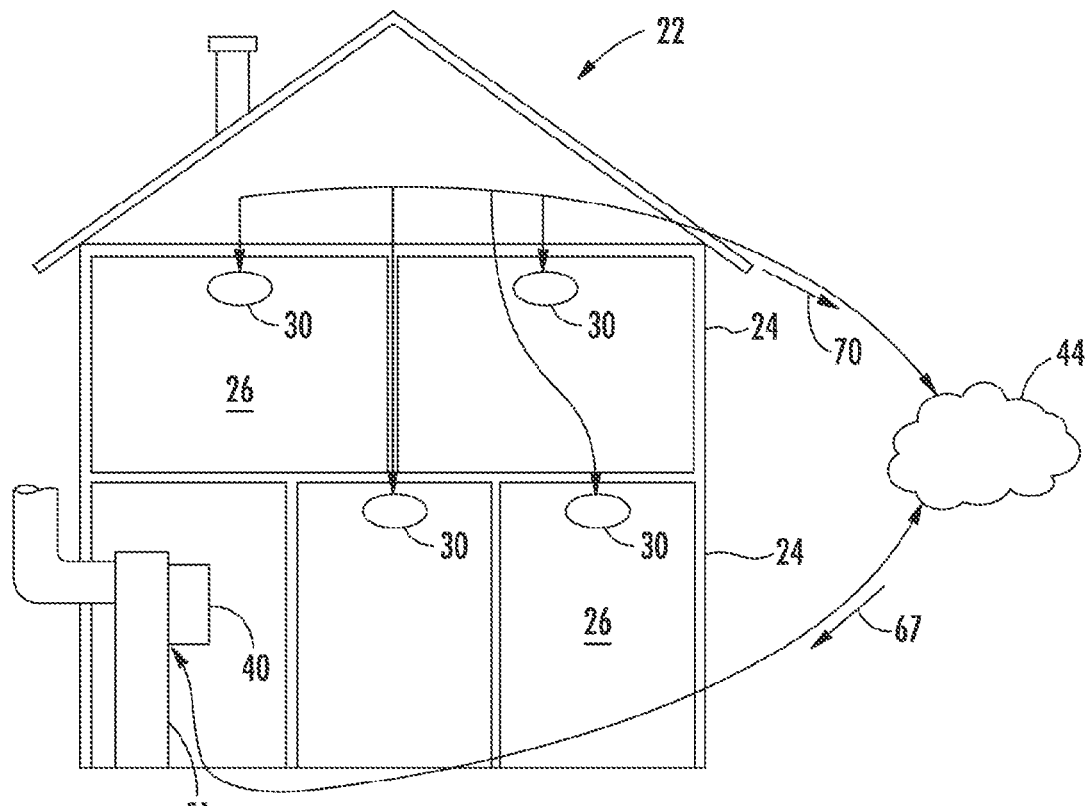
FIG. 6 is a system diagram of a second embodiment of the safety automation system having a plurality of temperature sensors as a detection device located throughout the occupiable structure and a central air handling heating and cooling system as an appliance.

Referring to FIGS. 2 and 6, the automation system 20 may further facilitate improvement of air temperature distribution in the occupiable structure 22 by using a plurality of temperature sensors 30 (i.e., detection devices) located at multiple sensing points throughout the structure 22 to locate hot and/or cold spot conditions and adjust the heating and cooling system accordingly. More specifically, the temperature sensor 30 may identify a hot/cold spot condition and send this identification to the management system 44 via wireless signal 70, or the management system 44 (via the sensors 30) may continuously monitor the temperatures and identify hot/cold spots internally.

Once a hot/cold spot condition is identified by the management system 44, the system may send a command signal 67 to the condition deterrence device 40, which initializes a forced air heating and cooling system 51 that adjusts accordingly. It is further contemplated and understood that the temperature sensors 30 may be thermistors integrated into fire protection products. It is further contemplated and understood that the detection devices 30 may also include humidity sensors located throughout the structure 22 with the heating and cooling system 51 being utilized to control humidity and temperature to prevent, for example, mold growth.

Figure 7:
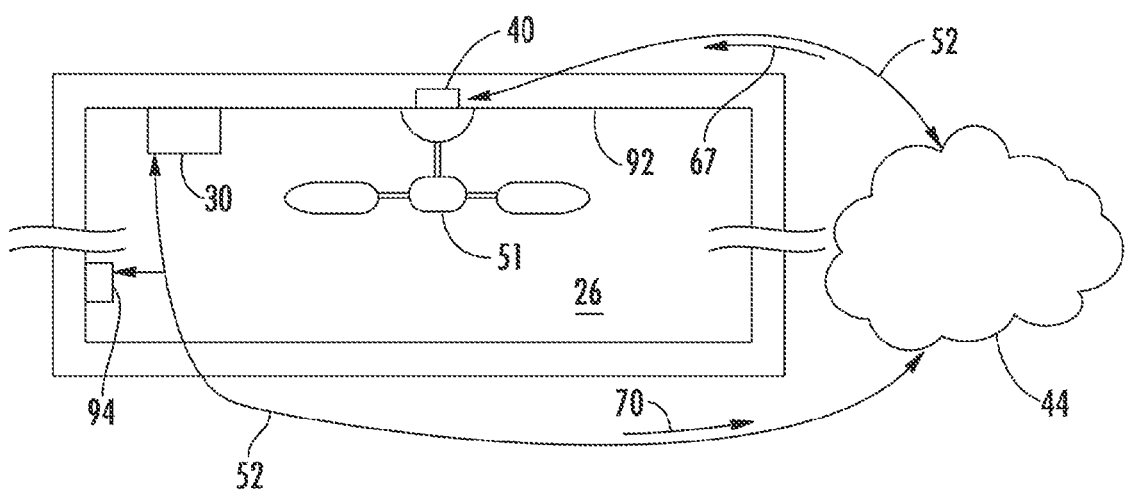
FIG. 7 is a system diagram of a third embodiment of the safety automation system having a temperature sensor as a detection device located near a ceiling of the occupiable structure and a ceiling fan as an appliance.

Referring to FIGS. 2 and 7, the automation system 20 may further facilitate improvement of air temperature distribution in the occupiable structure 22 by using a temperature sensor 30 (i.e., detection devices) located near the ceiling 92 of a room 26. Sensor 30 may compare a ceiling temperature with the temperature measured by a nearby, traditional wall thermostat 94, and when an upper limit temperature differential is reached, a ceiling hot temperature signal 70 may be sent to the management system 44. Alternatively, a temperature differential determination may not be required and only a high temperature signal 70 from the temperature sensor 30 is sent to the management system 44. Yet further, the temperature sensor 30 may send a continuous, or intermittent, signal to the management system 44 and the system determines when an upper temperature, or upper temperature differential, is reach. Once the management system 44 determines that the ceiling temperature is hot, the system may send a command signal 67 to the condition deterrence device 40 which initializes a ceiling fan 51 (i.e., appliance).

The detection devices 30 may also be carbon monoxide sensors that detect carbon monoxide trends for health monitoring purposes (i.e., lingering levels not necessarily government regulated or life threatening high levels). Although beneficial for all occupants, such monitoring may be particularly beneficial for pregnant women, elderly occupants, and infants. Similarly to monitoring of temperature, a plurality of carbon monoxide sensors 30 (i.e., detection devices) may be located at multiple sensing points throughout the structure 22 to locate areas of undesirable carbon monoxide levels. These levels may be sensed, via signals 70, and monitored and stored by the computing management system 44.

Actions by the safety automation system 20 may include notification and mitigation of the high carbon monoxide level by, for example, bringing in fresh air into the area or room where the hazard is detected. This may be accomplished through control of appliances 51 such as activating a ventilation system, the opening of a HVAC fresh air intake, opening of windows, and other appliances or means. Moreover, the system 20 may provide contact telephone numbers over, for example, the user interface device 32 of local businesses or individuals who can service the appliance and/or mitigate the hazardous condition (e.g., furnace, stove, etc.). Yet further, the system 20 may identify the origin of, for example, a gas leak, by detecting the highest concentration point.

Other features of the safety automation system 20 may include: the location of lost devices such as the user interface device 32 and/or the GPS transmitter device 42 using a radio ranging function (e.g., Blue Tooth Low Energy); use of integrated smoke alarm speakers 34 (i.e., as an ancillary alert device 34) for sound streaming at selected locations in the occupiable structure 22; and monitoring of the safe arrival of children into the structure utilizing, for example, security cameras (i.e., detection devices 30) and acoustic devices (i.e., dedicated and ancillary alert devices 34, 36). After arrival of the children, the system 20 may take a picture of the children through, for example, a detection device 30 that may be a camera and part of a security system. The picture may be sent through the computing management system 44 and to the user interface device 32 that may be a smart cellular phone carried by a parent.

Safety Automation:

Referring to FIGS. 1, 2, 5 and 8-10, the safety automation system 20 may be beneficial during a hazardous condition (e.g., fire) by controlling the energy flow into the occupiable structure 22, and controlling building access points (e.g., entry doors 96, see FIG. 1) for the safe egress and timely access of first responders into the structure 22. The system 20 may further control the HVAC system 51 to optimize egress conditions for occupants (e.g., electrostatic filters to capture smoke 86), and control hazard abatement devices 38 (e.g., fire suppression systems) to extinguish fires. Yet further, the system 20 may be beneficial during a hazardous condition by providing notifications via the user interface device 32 (as one example) entailing the locations of portable fire extinguishers. The system 20 may also adjust the sensitivity of fire and gas detection devices 30 based on structure 22 occupancy, time of day, and/or a detected increase in energy usage in parts or all of the structure 22. An unusually high increase in energy consumption may signify an electrical short that could lead to an electrical fire hazard. Early detection of such an electrical short may be a fire hazard preventative measure.

Figure 8:
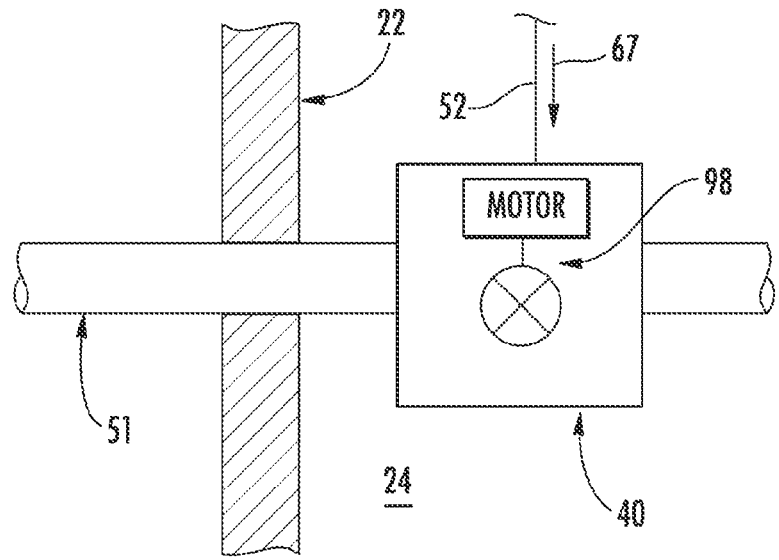
FIG. 8 is a system diagram of a fourth embodiment of the safety automation system having a condition deterrence device having an electrically actuated valve for a gas main as a non-limiting example of an appliance, and taken from circle 8 of FIG. 1.

Referring to FIGS. 1, 2 and 8 and with further regard to the control of energy flow, the system 20 may utilize various condition deterrence devices 40 with each device 40 associated with a respective one of various appliances 51. For example, the condition deterrence device 40 may be associated with a combustible gas main 51, and may include, for example, an electrically actuated isolation valve 98 (e.g. motor-controlled valve). In operation, when the detection device 30 detects a fire condition, a fire detected signal 70 may be wirelessly sent over pathway 52 to the computing management system 44. The management system 44 may then send a command signal 67 over the wireless pathway 52 instructing the condition deterrence device 40 to isolate the gas main 51 via the electric motor-controlled isolation valve 98. By isolating the combustible gas main 51, further aggravation of the fire condition may be substantially eliminated. It is further contemplated and understood that similar condition deterrence devices 40 may be applied directly to other appliances 51 such as, for example, gas clothes dryers, gas ovens and ranges, gas fireplaces, gas heating systems, gas domestic hot water tanks, and others. In addition, isolation of any combustible gas sources may be limited to those gas appliances 51 that are proximate to the fire condition only.

Figure 9:
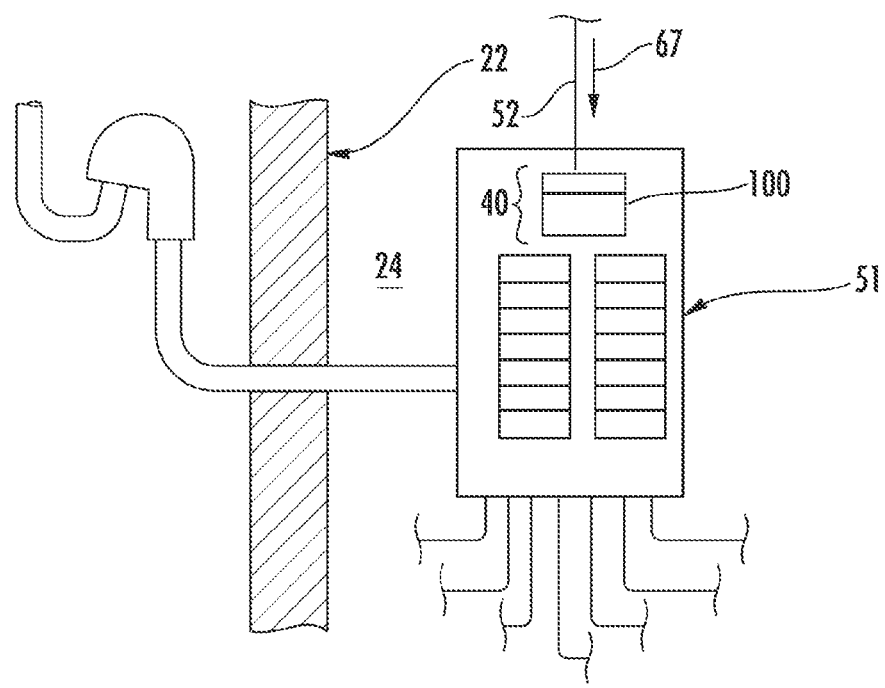
FIG. 9 is a system diagram of a fifth embodiment of the safety automation system having a condition deterrence device having circuit breaker for isolating an electric load center as a non-limiting example of an appliance.

Referring to FIGS. 1, 2 and 9, and with further regard to the control of energy flow, the condition deterrence devices 40 of system 20 may be associated with an electric power load center 51 (i.e., appliance). The load center 51 may provide the electric power to a portion or the entire occupiable structure 22, and the condition deterrence device 40 may include an electric switch, main circuit breaker or relay constructed to open the circuit (i.e. isolate electric power from the structure 22 or any portion thereof). In operation, when the detection device 30 detects a fire condition, a fire detected signal 70 may be wirelessly sent over pathway 52 to the computing management system 44. The management system 44 may then send a command signal 67 over the wireless pathway 52 instructing the condition deterrence device 40 to isolate the electric load center 51 via the isolating circuit breaker 100. By isolating the electric load center, further aggravation of the fire condition may be substantially eliminated and an electric hazard condition as a result of fire damage may be minimized or eliminated. It is further contemplated and understood that similar condition deterrence devices 40 may be applied directly to other appliances 51 such as, for example, solar panels and others. In addition, isolation of any electric loads may be limited to those appliances 51 that are proximate to the fire condition only.

Figure 10:
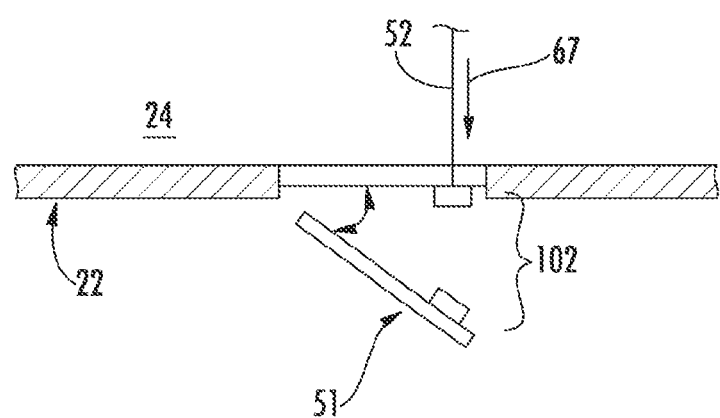
FIG. 10 is a system diagram of a sixth embodiment of the safety automation system having a condition deterrence device having an electric lock for unlocking an entry door as a non-limiting example of an appliance.

Referring to FIGS. 1, 2 and 10, and with regard to the control of access and egress points within the occupiable structure 22, the condition deterrence devices 40 of system 20 may be associated with electrically powered entry/egress points 51. One, non-limiting, example of a powered entry/egress point 51 may be an entry door; and one, non-limiting, example of a condition deterrence device 40 associated with the entry door 51 may include, for example, an electronic and/or electro-magnetic lock 102. In operation, when the detection device 30 detects a fire condition, a fire detected signal 70 may be wirelessly sent over pathway 52 to the computing management system 44. The management system 44 may then send a command signal 67 over the wireless pathway 52 instructing the condition deterrence device 40 to place the electro-magnetic lock 102 in an unlocked state to assure entry by first responders (e.g., firemen). Other examples of entry/egress points 51 may include windows, garage doors, pet doors, and curtains. Other examples of condition deterrence devices 40 may include locks on windows, a motorized garage door opener, a motorized device that opens and closes drapes or curtains, and others. It is further contemplated and understood, that certain entry/egress points 51 may be controlled to close upon detection of a fire condition to starve the fire 74 (see FIG. 1) of oxygen. Curtain systems may receive a command to open providing easier access for first responders.

Referring to FIGS. 1, 2 and 5, and with regard to the automated control of air quality in the occupiable structure 22, the condition deterrence device 40 of system 20 may be associated with the HVAC system 51 and an electrostatic air filter 88 of the HVAC system. As one, non-limiting, example of the deterrence device 40, the device may communicate directly with a control module 104 of the HVAC system 51.

In operation, when the detection device 30 detects a fire condition, a fire or smoke detected signal 70 may be wirelessly sent over pathway 52 to the computing management system 44. The management system 44 may then send a command signal 67 over the wireless pathway 52 instructing the condition deterrence device 40 to control the HVAC system 51 in accordance with pre-programmed instructions to remove or redirect smoke 86 for assisting first responders and assist in occupant evacuation of the structure 22.

Such pre-programmed instructions may include initializing the electrostatic filter 88 (i.e., providing electric power to the filter 88), initializing a blower 106 of the HVAC system 51, and re-aligning a series of motorized duct dampers or intelligent vents 107 to direct the air cleaning or redirecting operation to areas where required (e.g. occupant locations, egress routes, etc.). It is further contemplated and understood that the HVAC system 51 may include a humidifier 108 that may be controlled in addition, or alternatively, to the filter 88. That is, the humidifier, via the controller 104, or directly by the deterrence device 40, may initialize and/or increase the amount of moisture deposited into the outlet air stream (see arrow 110) of the HVAC system 51. With a moisture content increase, the fire 74 or its propagation may be at least in-part suppressed. It is further contemplated and understood that the intelligent vents 106 may be programmed, via the computing management system 44 to selectively close in order to deter propagation of smoke and to cut off the supply of oxygen to the fire.

With regard to adjusting the sensitivity of fire and gas detection devices 30 based on structure 22 occupancy, time of day, and/or an increase in energy usage in parts or all of the structure 22, the devices 30 may be adjusted directly or through the user interface device 32. Setpoints and or sensitivity levels may be stored in the computer readable storage medium 48.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A safety automation system for an occupiable structure comprising:
    a computing management system including a computer processor, and a computer readable storage medium configured to run embedded software;
    a first detection device adapted to detect a hazard condition and to output an associated hazard condition detected signal to the computing management system; and
    a second detection device adapted to detect the presence of an occupant in the occupiable structure and the occupant's proximity to the first detection device, and to output an occupied signal to the computing management system, and wherein the computing management system adjusts the sensitivity of the first detection device based on occupancy and proximity of the occupant to the first detection device;
    at least one ancillary alert device including lighting configured to accept respective electrical command signals from the computing management system associated with the hazard condition detected signal to assist in home evacuation;
    wherein the computing management system is further configured to track and associate, in accordance with the associated hazard condition detected signal output by the first detection device, the location and propagation path of the hazard condition and thereby control the lighting of the at least one ancillary device to assist in home evacuation without user intervention.

2. A safety automation system for an occupiable structure comprising:
    a detection device disposed in the occupiable structure adapted to detect a hazard condition and to output an associated hazard condition detected signal; and
    a computing management system in wireless communication with the detection device, the computing management system including a computer processor, and a computer readable storage medium configured to run embedded software, and wherein the computing management system is configured to adjust sensitivity of the detection device based on a time of day;
    at least one ancillary alert device including lighting configured to accept respective electrical command signals from the computing management system associated with the hazard condition detected signal to assist in home evacuation;
    wherein the computing management system is further configured to track and associate, in accordance with the associated hazard condition detected signal output by the detection device, the location and propagation path of the hazard condition and thereby control the lighting of the at least one ancillary device to assist in home evacuation without user intervention.

3. A safety automation system for an occupiable structure comprising:
    a detection device disposed in the occupiable structure adapted to detect a hazard condition and to output an associated hazard condition detected signal;
    a Global Position System transmitter device; and
    a computing management system in wireless communication with the detection device, the computing management system including a computer processor and a computer readable storage medium configured to run embedded software, and wherein computing management system is configured to determine a location of the Global Positioning System transmitter device and adjust a sensitivity of the detection device based on the location of the Global positioning System transmitter device;
    at least one ancillary alert device including lighting configured to accept respective electrical command signals from the computing management system associated with the hazard condition detected signal to assist in home evacuation;
    wherein the computing management system is further configured to track and associate, in accordance with the associated hazard condition detected signal output by the detection device, the location and propagation path of the hazard condition and thereby control the lighting of the at least one ancillary device to assist in home evacuation without user intervention.

4. The safety automation system for an occupiable structure of claim 1, further comprising:
    at least one condition deterrence device configured to accept respective electrical command signals from the computing management system associated with the hazard condition detected signal and to control at least one appliance as a result of the detected hazard condition to at least reduce risk presented by the hazard condition and assist in home evacuation;

wherein the computing management system is further configured to, in response to the associated hazard condition detected signal output by the first detection device, control the at least one appliance associated with the at least one condition deterrence device to assist in home evacuation without user intervention.

* * * * *